(12) United States Patent
Yamaguchi et al.

(10) Patent No.: US 12,007,665 B2
(45) Date of Patent: Jun. 11, 2024

(54) OPTICAL SIGNAL PROCESSING APPARATUS

(71) Applicant: Nippon Telegraph and Telephone Corporation, Tokyo (JP)

(72) Inventors: Keita Yamaguchi, Musashino (JP); Kenya Suzuki, Musashino (JP); Takashi Go, Musashino (JP); Osamu Moriwaki, Musashino (JP); Ai Yanagihara, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 343 days.

(21) Appl. No.: 17/419,489

(22) PCT Filed: Jan. 7, 2020

(86) PCT No.: PCT/JP2020/000137
§ 371 (c)(1),
(2) Date: Jun. 29, 2021

(87) PCT Pub. No.: WO2020/145257
PCT Pub. Date: Jul. 16, 2020

(65) Prior Publication Data
US 2022/0091473 A1    Mar. 24, 2022

(30) Foreign Application Priority Data
Jan. 10, 2019    (JP) .................................. 2019-002856

(51) Int. Cl.
*G02B 6/293*    (2006.01)
*G02F 1/313*    (2006.01)
*G02B 6/125*    (2006.01)

(52) U.S. Cl.
CPC ....... *G02F 1/3136* (2013.01); *G02B 6/29331* (2013.01); *G02B 6/29355* (2013.01); *G02F 1/313* (2013.01); *G02B 6/125* (2013.01)

(58) Field of Classification Search
CPC ................ G02B 6/125; G02B 6/29331; G02B 6/29355; G02F 1/313; G02F 1/3136
See application file for complete search history.

(56) References Cited

U.S. PATENT DOCUMENTS 9,857,534 B2 *    1/2018    Kusaka .................... G02B 6/14
10,649,144 B2 *   5/2020    Sakamoto .......... G02B 6/29344
(Continued)

FOREIGN PATENT DOCUMENTS

JP    H09-329720 A    12/1997
JP    2005-107229 A    4/2005
(Continued)

OTHER PUBLICATIONS

Toshio Watanabe et al., *Silica-based PLC Transponder Aggregators for Colorless, Directionless, and Contentionless ROADM*, OFC/NFOEC Technical Digest, Optical Fiber Communication Conference/National Fiber Optic Engineers Conference, 2012, Mar. 4, 2012, pp. 1-3.

(Continued)

*Primary Examiner* — Ryan A Lepisto
(74) *Attorney, Agent, or Firm* — Workman Nydegger

(57) ABSTRACT

To provide an optical signal processing device capable of reducing the crosstalk while narrowing the space between switch elements for downsizing, the optical signal processing device includes a plurality of input optical waveguides, a plurality of output optical waveguides, a plurality of optical waveguide elements arranged between the plurality of input optical waveguides and the plurality of output optical waveguides, and a connection optical waveguide.

(Continued)

The connection optical waveguide positioned closely to the optical waveguide element is differentiated in propagation constant from the optical waveguide configuring the closely arranged optical waveguide element. The connection optical waveguide positioned closely to the optical waveguide element is a connection optical waveguide having one end or both ends connected to the optical waveguide element, or a connection optical waveguide having both ends not connected to the optical waveguide elements.

8 Claims, 5 Drawing Sheets

(56) References Cited

U.S. PATENT DOCUMENTS

2009/0202189 A1    8/2009   Sugamata et al.
2014/0294344 A1   10/2014   Fondeur
2017/0299812 A1*  10/2017   Zhao .................... G02B 6/124

FOREIGN PATENT DOCUMENTS

| JP | 2007-114222 A | 5/2007 |
| JP | 2011-128206 A | 6/2011 |
| JP | 2015-75588 A  | 4/2015 |
| JP | 2018-36582 A  | 3/2018 |

OTHER PUBLICATIONS

Takashi Gohe et al., *High-Extinction Ratio and Low-Loss Silica-Based 8×8 Strictly Nonblocking Thermooptic Matrix Switch*, Journal of Lightwave Technology, vol. 17, No. 7, 1999, pp. 1192-1199.

T. Shibata et al., *Silica-Based Waveguide-Type 16×16 Optical Switch Module Incorporating Driving Circuits*, IEEE Photonics Technology Letters, vol. 15, No. 9, 2003, pp. 1300-1302.

* cited by examiner

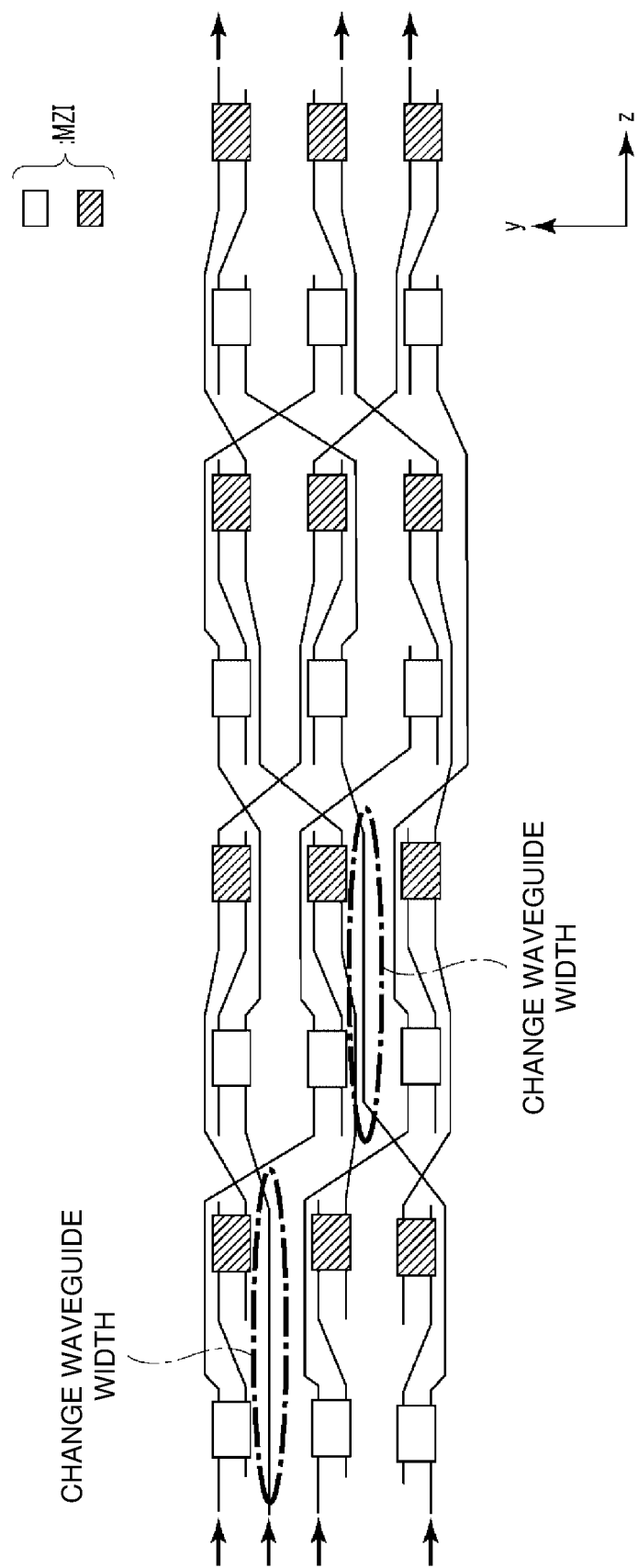

OPTICAL SIGNAL PROCESSING APPARATUS

TECHNICAL FIELD

The present invention relates to an optical signal processing device, and more particularly to an optical signal processing device having an optical switching function.

BACKGROUND ART

Conventionally, in optical communication networks, the introduction of an optical transmission communication method called CDC (Color-less, Direction-less, Contention-less)-ROADM (Reconfigurable Optical Add/Drop Multiplexer) has been promoted. In a node of a CDC-ROADM network, a multicast switch (MCS) is an optical input/output device serving as a key device, which makes it possible to connect transponders accommodated in the node, without depending on the wavelength of signal light (Color-less), and without causing any collision between optical signals having the same wavelength (Contention-less) and arbitrarily assigned to different routes (Direction-less) in the optical node.

In order to improve the efficiency of an optical transmission device, it is required to downsize the MCS. Small-sized MCSs using PLC (Planar Lightwave Circuit) and adopting a configuration called PILOSS (Path-Independent insertion-Loss) have been heretofore reported. (See the following Non-Patent Literatures 1 and 2)

Mach-Zehnder interferometer (MZI) switches (see Non-Patent Literature 3) are often adopted as switch elements for the above-mentioned MCS and PILOSS switches.

FIG. 1(a) is a diagram illustrating an MZI switch that is an element functioning as a switch element configured by optical waveguides. In the MZI switch illustrated in FIG. 1(a), an optical signal input from any one of two optical waveguides on the left end is branched, at a directional coupler on the left, into two, i.e., upper and lower, optical waveguides (arms). A phase change is given by a phase shifter formed at least one of two arm optical waveguides. Then, as a result of multiplexing and interfering at a directional coupler on the right side, a switched signal is output from any one of two optical waveguides on the right end according to the phase change.

FIG. 1(b) is a diagram illustrating an optical signal processing device (switch) that is configured by a plurality of switch elements such as MCS switches and PILOSS switches, which are connected in multiple stages. Using the plurality of MCS switches and PILOSS switches as switch elements and connecting them in a z-axis direction so as to form multiple stages, as illustrated in FIG. 1(b), can increase the extinction ratio of the switch. In this case, the number of MZI switches required to configure a switch having the same size is doubled.

CITATION LIST

Non-Patent Literature

Non-Patent Literature 1: T. Watanabe, et. al., "Silica-based PLC Transponder Aggregators for Colorless, Directionless, and Contentionless ROADM", OFC/NFOEC2012, OTh3D.1, Mar. 8, 2012, Los Angeles Non-Patent Literature 2: Takashi Goh, Akira Himeno, Masayuki Okuno, Hiroshi Takahashi, and Kuninori Hattori, "High-Extinction Ratio and Low-Loss Silica-Based 8×8 Strictly Nonblocking Thermooptic Matrix Switch", J. Lightwave Technology. VOL-17, NO. 7, p-p 1192-1199, July 1999

Non-Patent Literature 3: T. Shibata et al., "Silica-based waveguide-type 16×16 optical switch module incorporating driving circuits," in IEEE Photonics Technology Letters, vol. 15, no. 9, pp. 1300-1302, September 2003.

SUMMARY OF THE INVENTION

Technical Problem

FIG. 2 is a plan view illustrating a basic structure of a conventional optical signal processing device. In this description, the z axis represents the overall waveguide direction of light, the y axis represents the direction of the row of MZI switch elements, and the y-z plane represents a substrate plane of PLC (Planar Lightwave Circuit).

The optical signal processing device illustrated in FIG. 2 is configured to include MZI switches serving as four switch elements on an input side at the left end and MZI switches serving as four switch elements on an output side at the right end and further include MZI switches serving as switch elements arranged between the input-side MZI switches and the output-side MZI switches. The MZI switches are connected by optical waveguides. In each of rows arranged in the y-axis direction, the MZI switches are connected to form four stages. The illustration of FIG. 2 includes, in addition to the optical waveguide connecting the output of a front-stage MZI switch and the input of a rear-stage MZI switch in each row, an optical waveguide formed between the row of MZI switches connected in three stages in the second row in the y-axis direction and the row of MZI switches connected in three stages in the third row, of the MZIs arranged in the y-z plane.

However, in the configuration of the conventional optical signal processing device illustrated in FIG. 2, when the space between the switch elements in the y-axis direction becomes smaller, for example, because of the requirement of downsizing the optical signal processing device, it becomes necessary that the optical waveguide configuring the MZI switch and the optical waveguide are positioned closely. It is known that, when the optical waveguides are positioned closely, the propagation mode coupling occurs and the optical signal is transferred from one optical waveguide to another optical waveguide. Therefore, narrowing the switch element space causes optical signal leakage (crosstalk) between the optical signals and deteriorates signal characteristics of the optical signals.

To solve the above problem, it is necessary to sufficiently widen the space between the switch elements. As a result, there is a problem that the chip size of the PLC is increased.

In view of the above-mentioned problem, the present invention intends to provide an optical signal processing device capable of reducing the crosstalk while narrowing the space between the switch elements for downsizing.

Means for Solving the Problem

To achieve the above object, an aspect of the present invention provides an optical signal processing device. An optical signal processing device according to one embodiment includes a plurality of input optical waveguides, a plurality of output optical waveguides, a plurality of optical waveguide elements arranged between the plurality of input optical waveguides and the plurality of output optical waveguides, and a connection optical waveguide, and is characterized in that the connection optical waveguide positioned closely to the optical waveguide element is differentiated in propagation constant from the optical waveguide configuring the closely positioned optical waveguide element.

Effects of the Invention

As described above, the present invention can realize an optical signal processing device capable of reducing the crosstalk while narrowing the space between the switch elements.

BRIEF DESCRIPTION OF DRAWINGS

FIG. 4 is a diagram illustrating a configuration of an optical signal processing device of a second embodiment.

DESCRIPTION OF EMBODIMENTS

Figure 1:
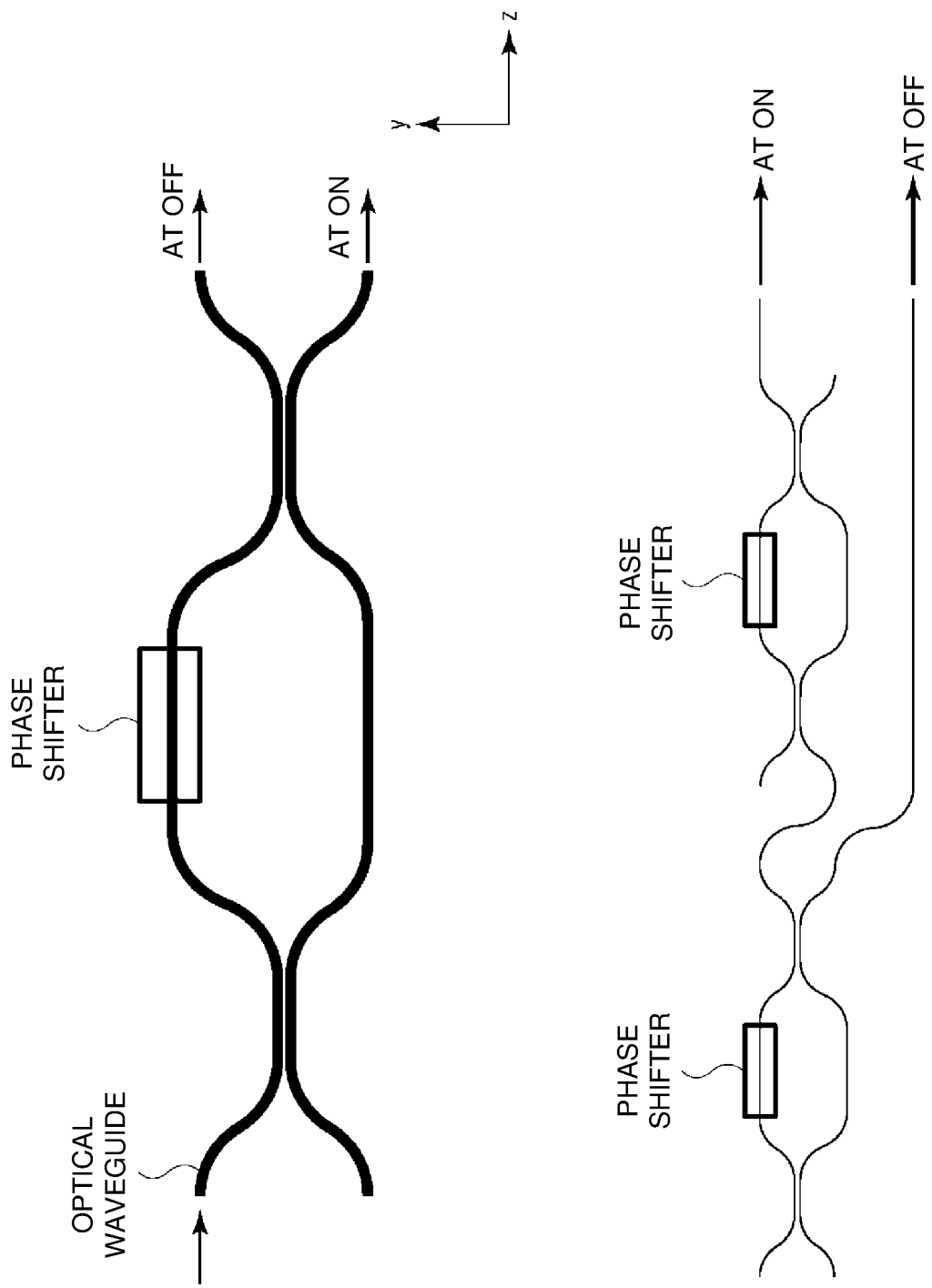
FIG. 1(a) is a diagram illustrating a switch element (MZI switch) configured by optical waveguides.
FIG. 1(b) is a diagram illustrating an optical signal processing device (switch) configured by a plurality of switch elements connected with each other.
Figure 2:
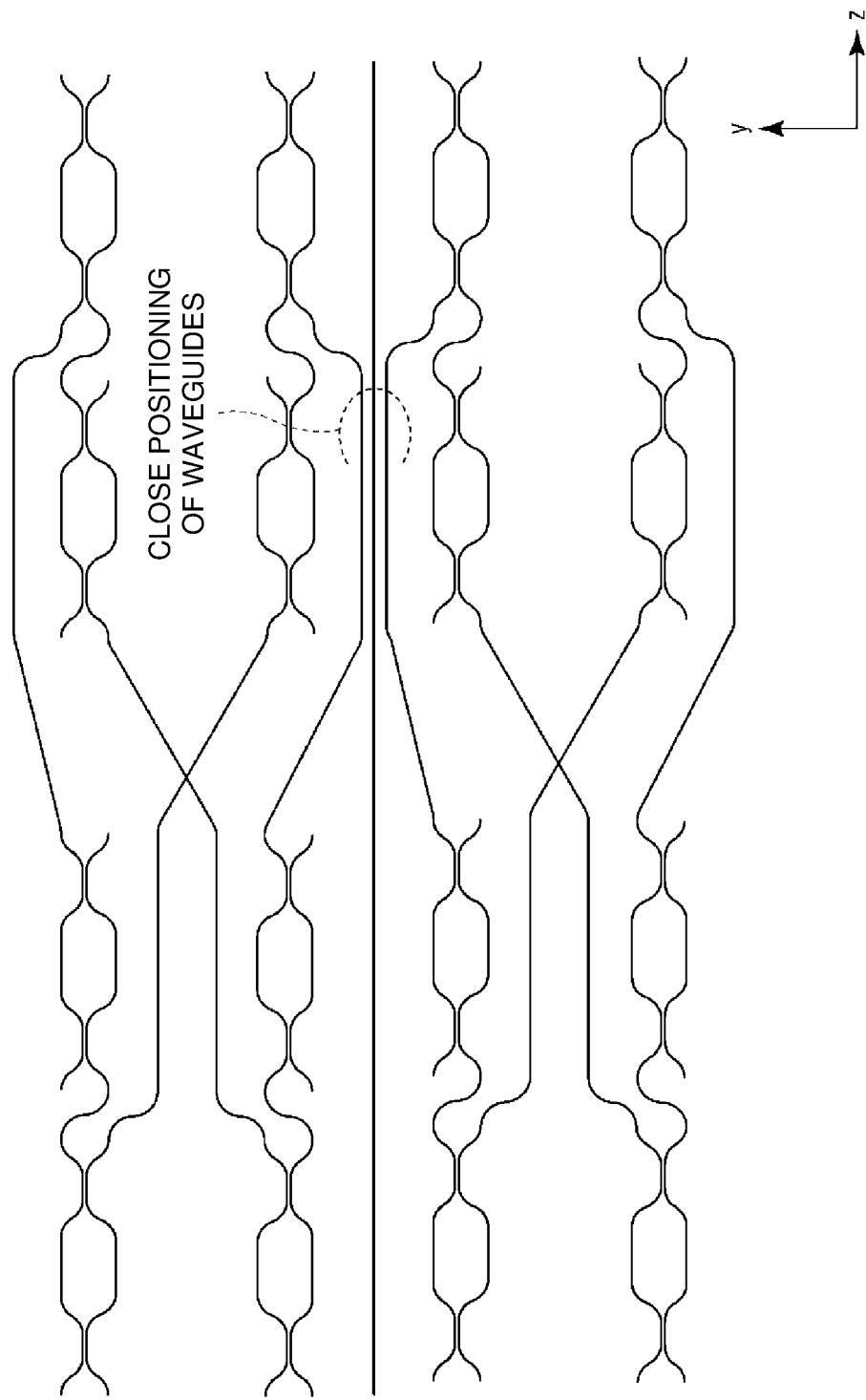
FIG. 2 is a diagram illustrating an optical signal processing device (switch) including a plurality of switch elements arranged in the y-axis and z-axis directions, and is configured to connect the output of one switch element to the input of another switch element.

The basic idea of the present invention can be summarized by the following items (i) to (iii), for example.

(i) A multi-input/multi-output optical switch having a PILOSS configuration includes switch elements connected in multiple stages and has a configuration in which, among the switch elements, an output of a front-stage switch element and an input of a rear-stage switch element are connected.

(ii) In the case of connecting switch elements while skipping a switch element of a specific stage, for example, it is necessary to provide an optical waveguide between the switch elements. (For example, in a p-th row, switch elements are arranged in multiple stages, and when connecting an output of an nth stage switch element and an input of an (n+2)th switch element among the switch elements, it is necessary to form an optical waveguide for skipping an (n+1)th switch element so that the optical waveguide is connected between the (n+1)th switch element in the p-th row and the (n+1)th switch element in the (p+1)th row (or (p−1)th row).)

(iii) Differentiating the optical waveguide formed between the switch elements in the above description (ii), in propagation constant, from the optical waveguide configuring the switch element can suppress the crosstalk (TX) of optical signals, which may occur between the optical waveguide configuring the switch element and the optical waveguide formed between the switch elements.

Configuring an optical signal processing device so as to satisfy the above features can narrow the space between the switch elements while securing low crosstalk characteristics.

Since the switch element is usually configured by an element mainly including an optical waveguide such as MZI, for example (see FIG. 1(a)), it is referred to as an optical waveguide element in the following description.

Hereinafter, embodiments of the present invention will be described in detail with reference to the attached drawings. In the drawings of respective embodiments described below, the left end of an optical signal processing device is defined as the input side and the right end is defined as the output side. However, in the optical waveguide elements and in the optical waveguide connecting them, the propagation direction of light is reversible, and the right end may be defined as the input side and the left end may be defined as the output side. Further, the optical signal processing device may have a multi-stage configuration, so that the optical waveguide on the output side of an optical waveguide element in each stage is connected to the optical waveguide on the input side of an optical waveguide element in the next stage. Alternatively, the optical waveguide element on the output side in the front stage may be the optical waveguide element on the input side in the rear stage.

First Embodiment

Figure 3A:
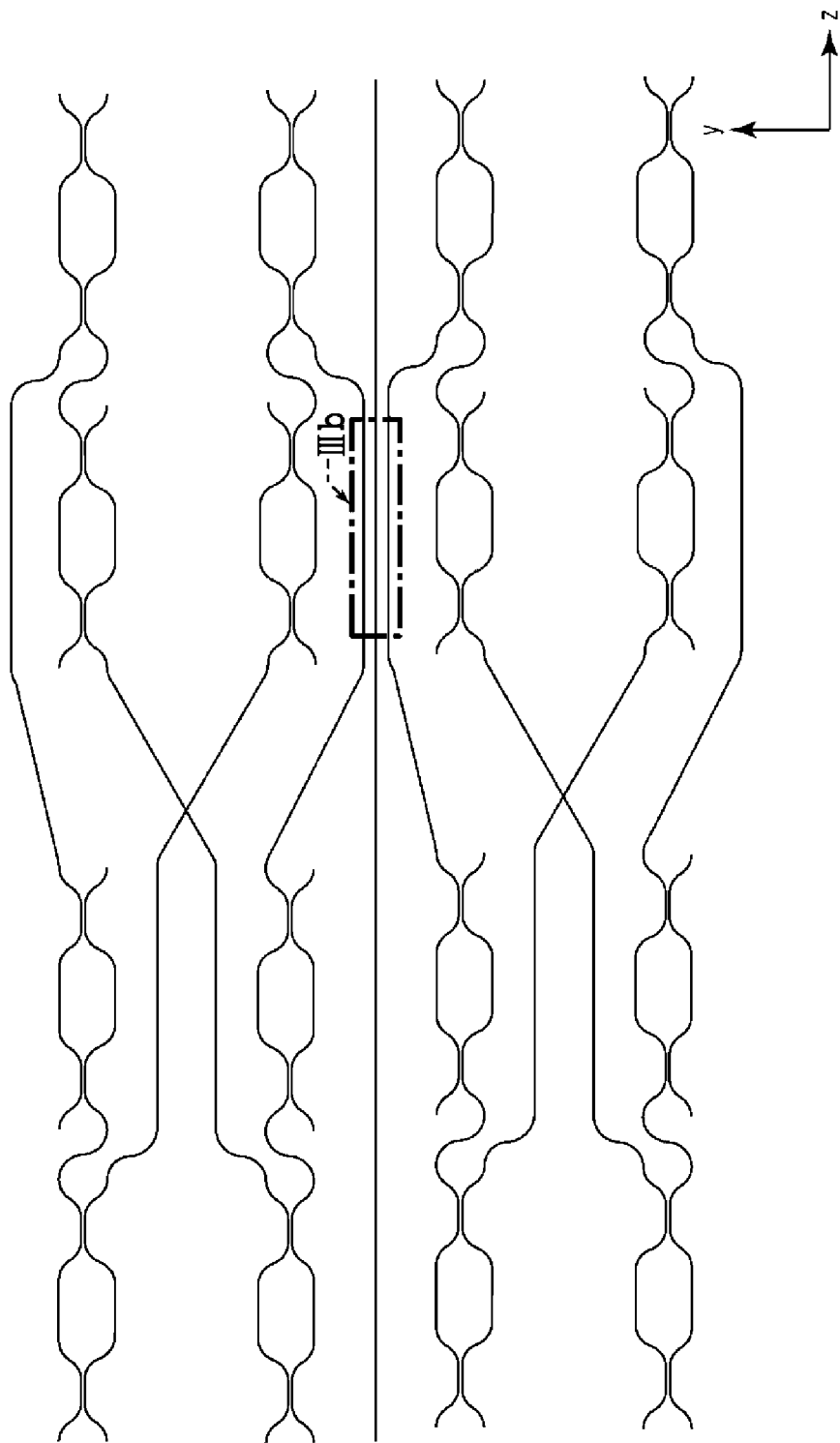
FIG. 3(a) is a diagram illustrating a configuration of an optical signal processing device of a first embodiment.

FIG. 3(a) is a plan view illustrating connection optical waveguides and switch elements of an optical signal processing device according to a first embodiment of the present invention.

In FIG. 3(a), to simplify the description, the illustrated optical signal processing device includes eight optical waveguide elements, four of which are arranged on the input side at the left end and another four of which are arranged on the output side at the right end, like the conventional example illustrated in FIG. 1. The optical signal processing device further includes eight optical waveguide elements arranged between the four optical waveguide elements on the input side and the four optical waveguide elements on the output side. The 16 optical waveguide elements in total are arranged in a pattern of four lines and four rows in the y-z plane. Four connection optical waveguides of two sets connect between the optical waveguide elements on the input side and the optical waveguide elements on the output side. Further, in FIG. 3(a), an optical waveguide not connected to the 16 switch elements illustrated in the drawings is arranged so as to extend from left to right between the switch elements (between the switch elements arranged in the second row and the switch elements arranged in the third row in the y-axis direction). As described above, if the space between the optical waveguide elements in the y-axis direction is narrow, the propagation modes of the optical waveguides will be combined and the crosstalk may occur between the optical waveguides.

Figure 3B:
FIG. 3(b) is a diagram illustrating a part of FIG. 3(a) and is an enlarged view illustrating a region where an optical waveguide connecting switch elements and an optical waveguide not connected to a switch element are positioned closely.

FIG. 3(b) is a diagram illustrating an optical waveguide formed between third-stage (third from the left) switch elements of the second and third rows in the y-axis direction in FIG. 3(a). FIG. 3(b) is an enlarged view illustrating a region where the optical waveguides (or the optical waveguides configuring the switch elements) respectively connecting the second-stage (second from the left) switch elements and the fourth-stage (fourth from the left) switch elements in the second and third rows in the y-axis direction in FIG. 3(a) and the optical waveguide not connected to the illustrated switch element are positioned closely, in the case where each switch element is MZI.

The propagation mode coupling strength of optical waveguides positioned closely becomes stronger as the space between the optical waveguides becomes narrower regardless of shortness of distance in positioning closely. Therefore, if the optical waveguides are positioned so closely, the crosstalk of optical signals will occur. Further, the coupling strength is maximized when propagation constants thereof are the same, and becomes smaller when propagation constants thereof are different.

The propagation constant of an optical waveguide changes depending on the difference in refractive index between a core and a clad, the refractive index distribution, and the shape of the core. When the optical signal processing device is configured by optical waveguides formed on one chip, the refractive indices of the core and the clad are usually determined at the time of formation, but it is possible to control the propagation constant by changing the shapes of the optical waveguides positioned closely. In particular, the thickness of the optical waveguide can be controlled by an exposure mask to be used when the core is formed and can be easily changed.

In the present embodiment, as illustrated in FIG. 3(b), the optical waveguides positioned closely are differentiated in thickness so as to change the propagation constants thereof. As a result, it is possible to suppress the propagation mode coupling therebetween and the resulting crosstalk. In FIG. 3(b), the central optical waveguide of three neighboring optical waveguides is configured to be larger in thickness (width in the y-axis direction) than two other optical waveguides. In the case where two optical waveguides other than the central optical waveguide illustrated in FIG. 3(b) are positioned closely to the optical waveguides configuring the third-stage (third from the left) switch elements of the second and third rows in the y-axis direction in FIG. 3(a), in order to reduce the crosstalk between optical signals propagating them, the two optical waveguides other than the central optical waveguide illustrated in FIG. 3(b) may be differentiated in propagation constant from the optical waveguides configuring the switch elements illustrated in FIG. 3(a).

For example, when the space (distance in the y-axis direction) between neighboring optical waveguides is 40 μm, configuring the two optical waveguides in such a manner that the ratio in thickness (width in the y-axis direction) between two optical waveguides is 1.03, thereby differentiating propagation coefficients thereof, can suppress the crosstalk.

In the above-described embodiment, an optical waveguide having both ends connected to switch elements may be replaced by an optical waveguide having at least one end connected to a switch element, and/or an optical waveguide having both ends not connected to switch elements may be replaced by an optical waveguide having at least one end not connected to a switch element. Alternatively, in the above-described embodiment, either the optical waveguide having both ends connected to switch elements or the optical waveguide having both ends not connected to switch elements may be omitted. In this case, the optical waveguide having at least one end connected to a switch element may be differentiated in propagation constant from the optical waveguide configuring a switch element closely arranged in the y-axis direction. Alternatively, the optical waveguide having at least one end connected to a switch element may be differentiated in propagation constant from the optical waveguide configuring a switch element closely arranged in the y-axis direction.

Further, in the above-described embodiment, the optical waveguide having both ends connected to switch elements and the optical waveguide having both ends not connected to switch elements may be omitted. In switch elements closely arranged in the y-axis direction, optical waveguides configuring these switch elements may be differentiated in propagation constant.

Second Embodiment

FIG. 4 is a diagram illustrating a simplified configuration of an optical signal processing device according to a second embodiment of the present invention. The optical signal processing device of the present embodiment is a 4-input/3-output PILOSS switch. The above-described optical signal processing device includes input and output optical waveguides, switch elements, and connection optical waveguides connecting the switch elements. The above-described switch elements are MZI switches arranged two-dimensionally in the y-z plane. In such a PILOSS switch whose input and output are asymmetrical, there exists a connection optical waveguide that skips each stage of the switch elements arranged in multiple stages and connects to the switch element of the next stage.

As described above, the overall switch size can be reduced by setting the space between the switch elements as narrow as possible. However, if the space between two switch elements in the y-axis direction is too small, the propagation mode coupling and the crosstalk of optical signals will occur between the connection optical waveguide formed between the switch elements and the optical waveguide configuring the switch element (configuring the MZI switch).

To the contrary, differentiating the connection optical waveguide formed between the switch elements in thickness from the optical waveguide configuring the switch element can change the propagation constants thereof and can weaken the propagation mode coupling. As a result, the crosstalk of optical signals can be suppressed. Therefore, the optical waveguide space in the optical signal processing device can be reduced and the chip can be downsized.

Further, in order to skip the MZI switch of each stage, not only in the optical waveguide formed between the MZI switches but also in the closely positioned MZI switches, changing the propagation constants of the optical waveguides configuring the MZI switches can suppress the crosstalk of optical signals between the MZI switches. This can be achieved by adopting optical waveguides that are different in width, in the neighboring MZI switches.

Third Embodiment

Figure 5:
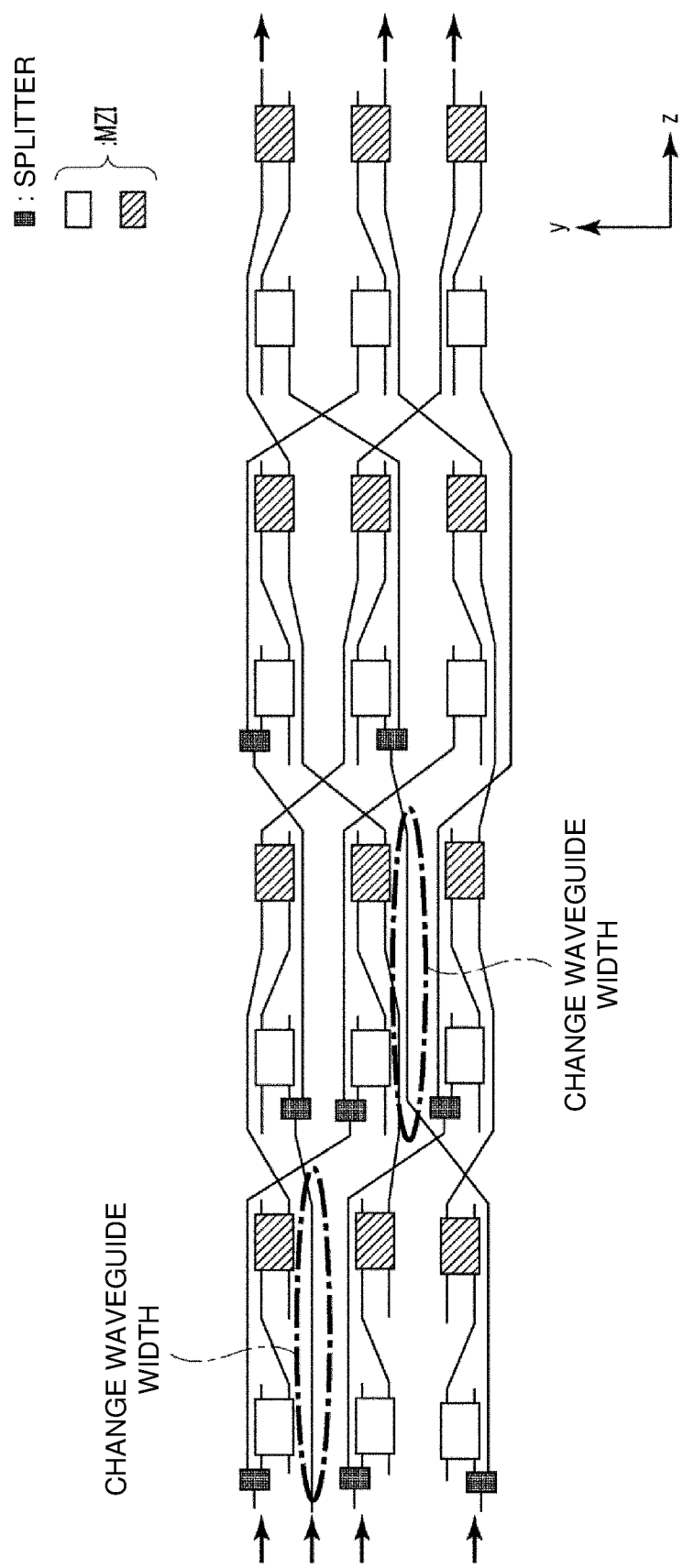
FIG. 5 is a diagram illustrating a configuration of an optical signal processing device of a third embodiment.

FIG. 5 is a diagram illustrating a simplified configuration of an optical signal processing device according to a third embodiment of the present invention. The optical signal processing device of the present embodiment is a multicast switch (MCS) in which a 4-input/3-output PILOSS configuration is adopted. The above-described optical signal processing device includes input and output optical waveguides, switch elements, connection optical waveguides connecting the switch elements, and optical splitters. The above-described switch elements are MZI switches arranged two-dimensionally in the y-z plane. According to this kind of switch adopting the PILOSS configuration whose input and output are asymmetrical, similar to the second embodiment, there exists a connection optical waveguide that skips each stage of the switch elements arranged in multiple stages and connects to the switch element of the next stage. Therefore, similar to the second embodiment, differentiating the connection optical waveguide formed between the switch elements in thickness from the optical waveguide configuring the switch element can change the propagation constants thereof and can weaken the propagation mode coupling. As a result, the crosstalk of optical signals can be suppressed. Further, in order to skip the MZI switch of each stage, not only in the optical waveguide formed between the MZI switches but also in the closely positioned MZI switches, changing the propagation constants of the optical waveguides configuring the MZI switches can suppress the crosstalk of optical signals between the MZI switches.

The invention claimed is:

1. An optical signal processing device including a plurality of input optical waveguides, a plurality of output optical waveguides, a plurality of optical waveguide elements arranged between the plurality of input optical waveguides and the plurality of output optical waveguides, and a first connection optical waveguide that connects a first one of the plurality of optical waveguide elements with a first one of the plurality of output optical waveguides, wherein
the connection optical waveguide is positioned closely to a non-connected optical waveguide that is not connected to any of the plurality of input waveguides, any of the plurality of output waveguides, and any of the plurality of optical waveguide elements,
the first connection waveguide is differentiated in propagation constant from the non-connected optical waveguide,
the first connection waveguide is not closely positioned to any of the plurality of input optical waveguides, and
the non-connected waveguide and the first connection optical waveguide are positioned between two of the plurality of optical elements that are not connected to the first connection optical waveguide.

2. The optical signal processing device according to claim 1, wherein the optical signal processing device includes a second connection optical waveguide that connects a second one of the plurality of optical elements with a second one of the plurality of output optical waveguides, and
the second connection optical waveguide is differentiated in propagation constant from the non-connected optical waveguide, or
the second connection optical waveguide is differentiated in propagation constant from the first connection optical waveguide.

3. The optical signal processing device according to claim 2, wherein the first connection optical waveguide and the non-connected optical waveguide are differentiated in optical waveguide width.

4. The optical signal processing device according to claim 2, wherein the plurality of optical waveguide elements include Mach-Zehnder interferometers.

5. The optical signal processing device according to claim 1, wherein the first connection optical waveguide and the non-connected optical waveguide are differentiated in optical waveguide width.

6. The optical signal processing device according to claim 5, wherein the optical signal processing device includes a second connection optical waveguide that connects a second one of the plurality of optical elements with a second one of the plurality of output optical waveguides, and
the second connection optical waveguide is differentiated in propagation constant from the non-connected optical waveguide, or
the second connection optical waveguide is differentiated in propagation constant from the first connection optical waveguide.

7. The optical signal processing device according to claim 5, wherein the plurality of optical waveguide elements include Mach-Zehnder interferometers.

8. The optical signal processing device according to claim 1, wherein the plurality of optical waveguide elements include Mach-Zehnder interferometers.

* * * * *